(12) United States Patent
Shahmohammadi

(10) Patent No.: US 11,188,175 B1
(45) Date of Patent: *Nov. 30, 2021

(54) DISPLAY SYSTEM WITH INTEGRATED DEPTH DETECTION

(71) Applicant: Facebook Technologies, LLC, Menlo Park, CA (US)

(72) Inventor: Mohsen Shahmohammadi, Menlo Park, CA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/161,216

(22) Filed: Jan. 28, 2021

Related U.S. Application Data

(63) Continuation of application No. 16/231,851, filed on Dec. 24, 2018, now Pat. No. 10,963,103.

(51) Int. Cl.
| | |
|---|---|
| *G06F 3/042* | (2006.01) |
| *G02F 1/1335* | (2006.01) |
| *G02B 27/01* | (2006.01) |
| *G06F 3/01* | (2006.01) |
| *G02B 27/14* | (2006.01) |
| *G01C 19/56* | (2012.01) |

(52) U.S. Cl.
CPC ....... *G06F 3/0425* (2013.01); *G02B 27/0172* (2013.01); *G02B 27/14* (2013.01); *G02F 1/133524* (2013.01); *G06F 3/013* (2013.01); *G01C 19/56* (2013.01); *G02B 2027/0178* (2013.01); *G02B 2027/0192* (2013.01)

(58) Field of Classification Search
CPC ....... G06F 3/0425; G06F 3/013; G02B 27/14; G02B 27/0172; G02B 2027/0192; G02B 2027/0178; G02F 1/133524; G01C 19/56
See application file for complete search history.

(56) References Cited

U.S. PATENT DOCUMENTS

| | | |
|---|---|---|
| 8,767,306 B1 | 7/2014 | Miao et al. |
| 2014/0055352 A1 | 2/2014 | Davis et al. |
| 2016/0351634 A1 | 12/2016 | Lim et al. |
| 2017/0123526 A1 | 5/2017 | Trail et al. |
| 2017/0370702 A1 | 12/2017 | Wan et al. |
| 2018/0088452 A1 | 3/2018 | Tajiri |
| 2018/0173303 A1 | 6/2018 | Liu et al. |
| 2019/0035154 A1 | 1/2019 | Liu |

*Primary Examiner* — Alexander Eisen
*Assistant Examiner* — Kebede T Teshome
(74) *Attorney, Agent, or Firm* — Fenwick & West LLP

(57) ABSTRACT

A display system comprises a light source assembly, a display assembly, a camera assembly, and a controller. The light source assembly is configured to generate visible light and infrared light. The display assembly is configured to generate image light using the visible light and to generate tracking light using the infrared light. The tracking light and the image light pass through a beam splitter prior to being projected into a local area. The camera assembly is configured to capture one or more images of the local area illuminated with the tracking light. The images are illuminated with the tracking light that passes through the beam splitter prior to be being captured by the camera assembly. The controller is configured to calculate depth information for objects in the local area using the one or more images.

20 Claims, 9 Drawing Sheets

DISPLAY SYSTEM WITH INTEGRATED DEPTH DETECTION

CROSS REFERENCE TO RELATED APPLICATION

This application is a continuation of U.S. patent application Ser. No. 16/231,851, filed Dec. 24, 2018, which is incorporated by reference in its entirety.

BACKGROUND

This present disclosure generally relates to display systems providing visual content to one or more users of an audio system, and additionally depth sensors for measuring depth of objects.

Wristband display devices typically include an electronic display that may present visual content to users of the wristband display devices, e.g., smart watches with graphical user interfaces presented on electronic displays. These devices are already limited by the size of the electronic display rendering these devices limited in useful functionality. Moreover, these devices primarily rely on touchscreen capabilities of the electronic display which consequently also limits interaction with the wristband display device to the size of the electronic display which is usually very compact.

SUMMARY

A wristband device has a display system for projecting visual content onto a portion of a user's arm. The display system comprises a light source assembly, a display assembly, a camera assembly, and a controller. The light source assembly comprises one or more emitters that are configured to generate visible light and infrared light. The visible light and the infrared light are reflected by a beam splitter towards the display assembly. The display assembly is configured to generate image light using the visible light and to generate tracking light using the infrared light. The image light and the tracking light pass through the beam splitter towards an output assembly. The output assembly projects the image light and the tracking light into a local area, e.g., onto a portion of the user's arm. The camera assembly is configured to capture one or more images of the local area illuminated with the tracking light. The images are illuminated with the tracking light that is reflected by the beam splitter prior to be being captured by the camera assembly. The controller is configured to use the one or more images for calculating depth information for objects in the local area, which may include a user's fingers. The controller is further configured to manage operation of the light source assembly and the display assembly.

Alternatively, a headset has a display system for display visual content to a user's eyes via a waveguide assembly. In these embodiments, the output assembly includes the waveguide assembly comprising one or more waveguides for directing the image light and the tracking light to the user's eyes. The controller may use the depth information to calculate one or more eye positions of the user's eyes.

Figure 1A:
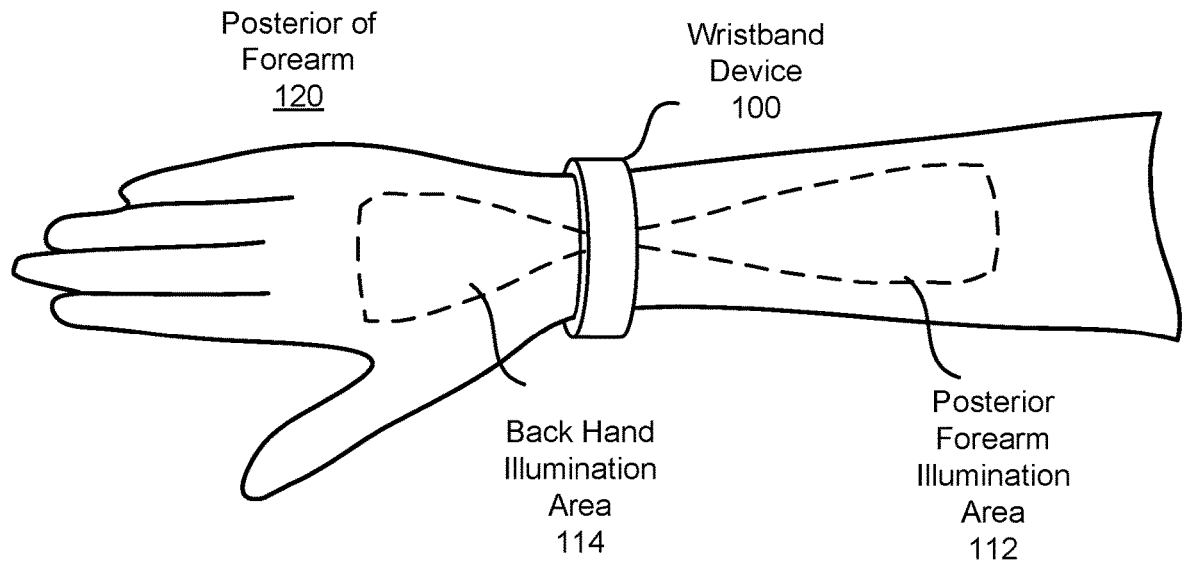
FIG. 1A is a top plan view of a wristband device with a display system on a user's wrist, in accordance with one or more embodiments.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

Embodiments of the invention may include or be implemented in conjunction with an artificial reality system. Artificial reality is a form of reality that has been adjusted in some manner before presentation to a user, which may include, e.g., a virtual reality, an augmented reality, a mixed reality, a hybrid reality, or some combination and/or derivatives thereof. Artificial reality content may include completely generated content or generated content combined with captured (e.g., real-world) content. The artificial reality content may include video, audio, haptic sensation, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a wristband device, a headset (e.g., an eyewear device, a head-mounted display (HMD) assembly with the eyewear device as a component, a HMD connected to a host computer system, a standalone HMD), a mobile device or computing system, or any other hardware platform capable of providing artificial reality content to one or more viewers. In addition, the artificial reality system may implement multiple input/output devices for receiving user input which may influence the artificial reality content provided to the user.

Overview

A device with a display system is configured to project visual content into a local area. The display system comprises a light source assembly, a display assembly, a camera assembly, and a controller. The light source assembly comprises one or more emitters that are configured to generate visible light and infrared light. The visible light and the infrared light are reflected by a beam splitter towards the display assembly. The display assembly is configured to generate image light using the visible light and to generate tracking light using the infrared light. The image light and the tracking light pass through the beam splitter towards an output assembly which projects the image light and the tracking light into a local area. The local area surrounds the display system and includes one or more illumination areas for projecting the image light and the tracking light and determining depth information of one or more objects in the illumination areas. The camera assembly is configured to capture one or more images of the local area illuminated with the tracking light. The images are illuminated with the tracking light that is reflected by the beam splitter prior to be being captured by the camera assembly. The controller is configured to use the one or more images for calculating depth information for objects in the local area. The controller is further configured to manage operation of the light source assembly and the display assembly. The display system affords an advantage over conventional display systems in that the projection of visual content and recording of depth information share a common optical pathway. In other words, the image light and the tracking light are projected through the output assembly into the local area while the camera assembly captures images of the local area illuminated by the tracking light that also passes through the output assembly. This advantage may aid in reducing form factor of the device without comprising on functionality.

In some embodiments, the device may be worn by a user, e.g., as a wristband device on one of their wrists or as a headset on a user's head. As a wristband device, the local area includes a portion of the user's arm and the determined depth information may describe one or more depth distances of one or more objects around the portion of the user's arm. The portion of the user's arm may include any combination of a back hand, a palm, a posterior forearm, and an anterior forearm. As a headset, the local area includes an eye-box where a user's eyes and the determined depth information may describe one or more eye positions of the user's eyes for use in tracking the user's eyes.

FIG. 1A is a top plan view of a wristband device 100 with a display system on a user's wrist, in accordance with one or more embodiments. In this illustration, the posterior view 120 of the user's forearm is shown with the wristband device 100 on the user's wrist. As seen in this illustration, the local area for presentation of visual content by the wristband device 100 may include any combination of a posterior forearm illumination area 112 and a back hand illumination area 114 for projecting visual content onto any combination of a back hand and a posterior forearm of the user's arm while also tracking one or more objects around any combination of the back hand and the posterior forearm of the user's arm.

Figure 1B:
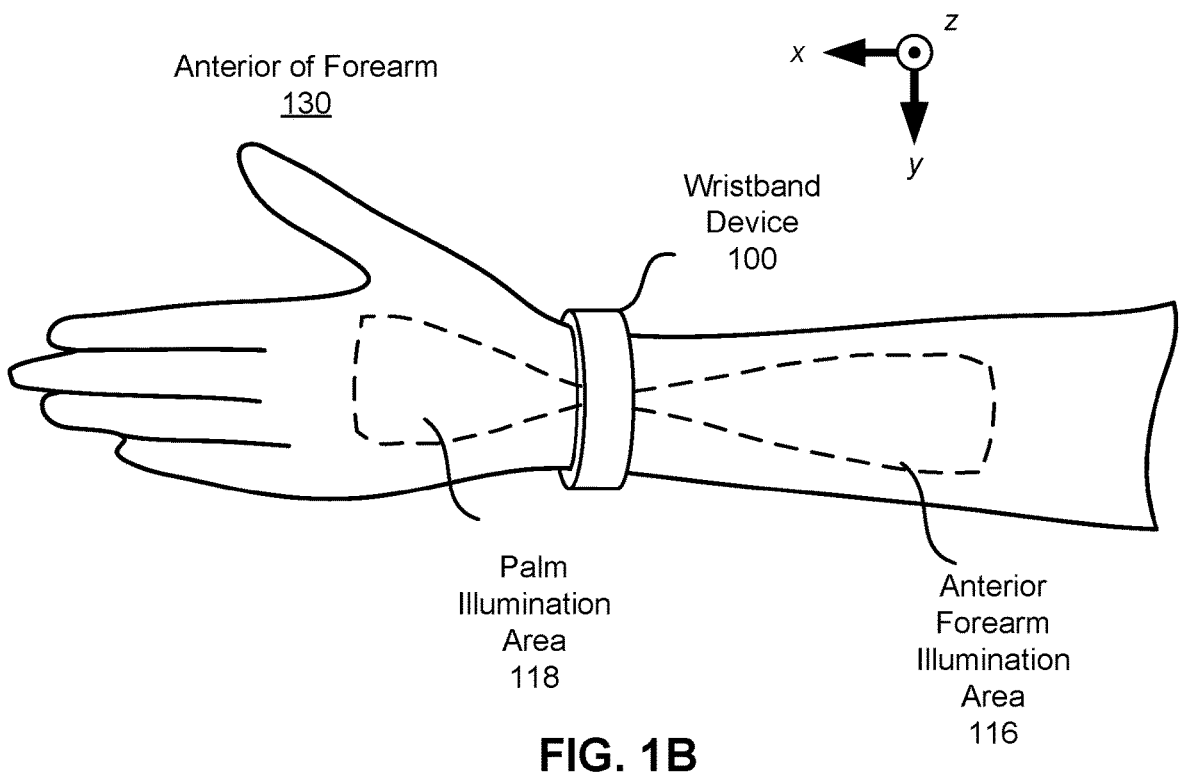
FIG. 1B is a bottom plan view of a wristband device with a display system on a user's wrist, in accordance with one or more embodiments.

FIG. 1B is a bottom plan view of a wristband device 100 with a display system on a user's wrist, in accordance with one or more embodiments. In this illustration, the anterior view 130 of the user's forearm is shown with the wristband device 100 on the user's wrist. As seen in this illustration, the local area for presentation of visual content by the wristband device 100 may include any combination of an anterior forearm illumination area 116 and a palm illumination area 118 for projecting visual content onto any combination of a palm and an anterior forearm of the user's arm while also tracking one or more objects around any combination of the back hand and the posterior forearm of the user's arm.

Wristband Device

Figure 2:
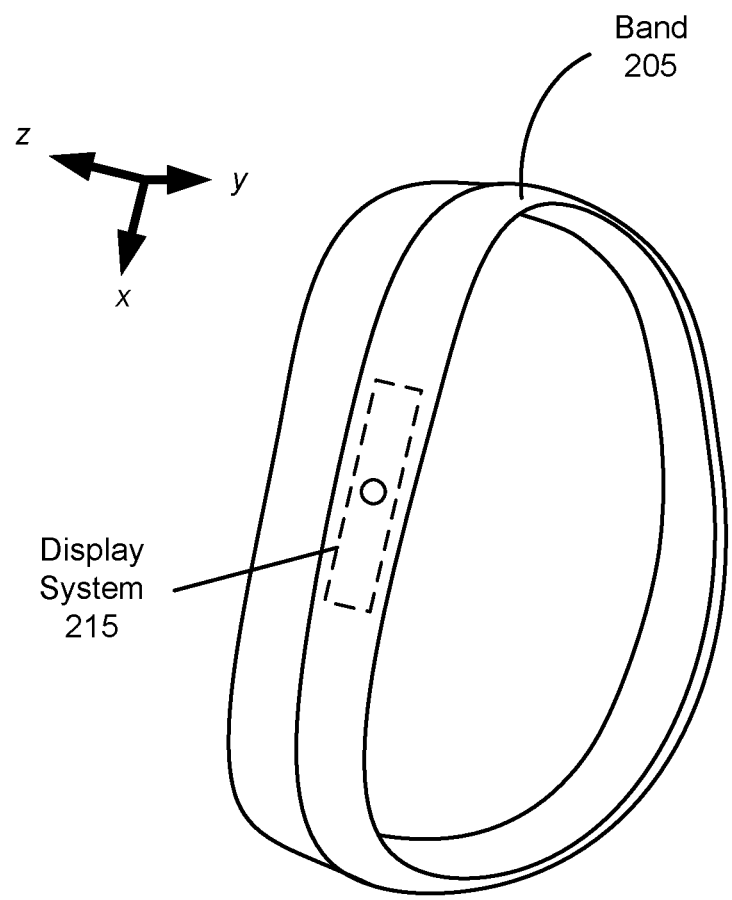
FIG. 2 is a perspective view of a wristband device with a display system, in accordance with one or more embodiments.

FIG. 2 is a perspective view of a wristband device 200 with a display system 215, in accordance with one or more embodiments. The wristband device 200 with the display system 215 projects visual content onto a portion of a user's arm when coupled to the user's wrist. Additionally, the display system 215 is configured to measure depth information of objects in the local area, e.g., on a portion of the user's arm when the wristband device 200 is coupled to the user's wrist. The wristband device 200 has a band 205 and the display system 215. In other embodiments, the wristband device 200 may have additional components than those listed herein, e.g., multiple display systems 215. The wristband device 100 is an embodiment of the wristband device 200.

The band 205 secures the wristband device 200 to a user's wrist. The band 205 forms a loop that couples to the user's wrist. The band 205 may be configured to adjust a size of the loop for coupling to wrists of varying sizes. Alternatively, the band 205 may have two straps that are fastened together to secure the wristband device 200 to the user's wrist. The band 205 may be constructed by a flexible material—e.g., rubber, silicon, or leather—that may provide comfort when worn by the user.

The display system 215 projects visual content into a local area and determines depth information of objects in the local area. The display system 215 may be located on a portion of the band 205. The display system 215 has, among other components, a light source assembly, a display assembly, a camera assembly, an output assembly, and a controller. The light source assembly is configured to generate visible light and infrared light. The visible light includes light generated in any visible color channel; whereas, infrared light includes light generated in an infrared channel. The display assembly is configured to generate image light using the visible light and to generate tracking light using the infrared light. The generated image light includes light from one or more visible color channels that forms a portion of visual content that is provided to the user. The generated tracking light includes light from an infrared channel that illuminates the local area. In some embodiments, the tracking light may be formed as a structured illumination pattern for use in calculating depth information by comparing the structured illumination pattern to a reflection of the structured illumination pattern off one or more surfaces in the local area. In other embodiments, the tracking light may be formed as an infrared flash for use in calculating depth information by determining a time of flight of the infrared flash from generation to time of capture. The tracking light and the image light pass through a beam splitter. The output assembly projects the tracking light and the image light into a local area, e.g., a portion of the user's arm. The camera assembly is configured to capture one or more images of the local area illuminated with the tracking light, e.g., a reflection of the structured illumination pattern and/or a reflection of the infrared flash. Tracking light from the local area passes through the beam splitter prior to be being captured by the camera assembly. The controller is configured to calculate depth information for objects (e.g., one or more thumbs or one or more fingers) in the local area using the one or more images. The display system 215 has the advantage that the projection of visual content and recording of depth information share a common optical pathway, e.g., through the output assembly. In contrast, conventional depth determination systems generally are composed of an illumination source and a separate camera that do not share an optical path, and accordingly have a much larger form factor than the embodiments discussed herein. Additional details about the display system 215 can be found in the detailed description of FIGS. 3-5.

Display System

Figure 3:
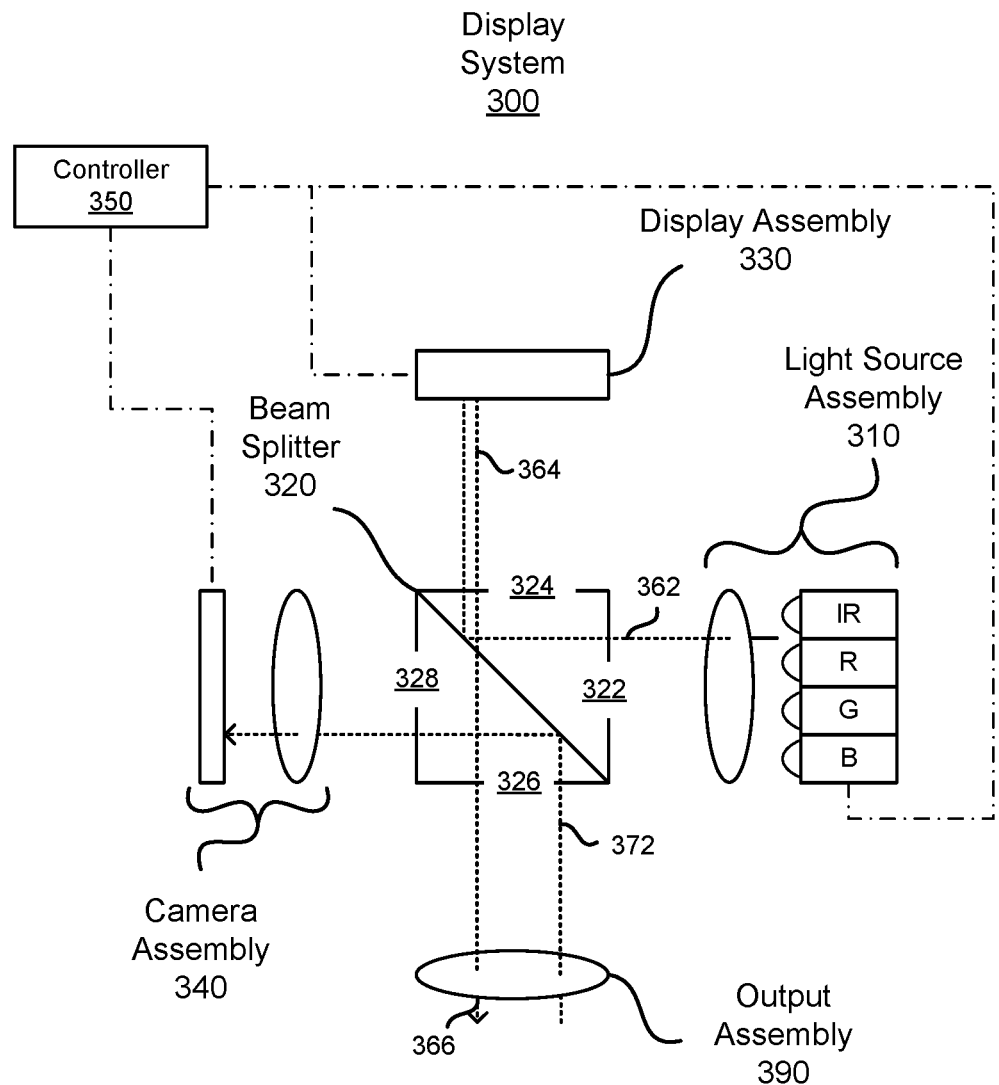
FIG. 3 illustrates a display system, in accordance with one or more embodiments.

FIG. 3 illustrates a display system 300, in accordance with one or more embodiments. The display system 300 projects visual content into a local area. The display system 300 also measures depth information of objects in the local area, e.g., in relation to the projected visual content. The display system 300 has a light source assembly 310, a beam splitter 320, a display assembly 330, a camera assembly 340, an output assembly 390, and a controller 350. In other embodiments, the display system 300 comprises additional or fewer components than those listed herein. The display system 215 is an embodiment of the display system 300.

The light source assembly 310 is configured to generate visible light and infrared light in accordance with display instructions from the controller 350. The light source assembly 310 comprises one or more pixels, each pixel comprising one or more emitters configured to generate visible light and/or infrared light (e.g., including near-infrared), in accordance with display instructions from the controller. The emitters may be any combination of light emitting diodes (LEDs), laser diodes (e.g., edge emitters), inorganic or organic LEDs, micro LEDs, a vertical-cavity surface-emitting laser (VCSEL), or some other source. In some embodiments, each emitter may be configured to generate one of visible light and infrared light. In additional embodiments, each emitter configured to generate visible light may be further segregated to generate one of a plurality of ranges of wavelengths in the visible light channel, e.g., one emitter configured to generate visible light in a range of wavelengths for green light with another emitter configured to generate visible light in a range of wavelengths for red light, etc. In one example, each pixel may have emitters configured to generate infrared light and visible light including red, green, and blue light. Additionally, the pixels in the light source assembly 310 may be configured in a line or in a 2-dimensional array (e.g., n×N array where n and N are integers). The visible light and the infrared light may be time multiplexed such that the visible light and/or the infrared light are generated at varying times. For example, at a first time period, the light source assembly 310 generates the visible light and, at a second time period, the light source assembly 310 generates the infrared light.

The light source assembly 310 may, more specifically, be configured to generate visible light and infrared light that is collimated. The light source assembly 310 may additionally include a collimator configured to collimate the visible light and the infrared light generated by the emitters. The light source assembly 310 may have additional optical elements (e.g., one or more lenses, one or more waveplates, etc.) for conditioning (e.g., polarizing, collimating, expanding, etc.) of the visible light and the infrared light.

The beam splitter 320 splits an incident light beam into two separate beams that have different propagation pathways. In some embodiments including the illustrated embodiment, the beam splitter 320 is a cube formed from two triangular prisms that split light such that a first portion of the light transmits through the two triangular prisms and a second portion of the light reflects off the interface of the two triangular prisms. With the cube, the beam splitter 320 has four sides. A first side 322 is configured to interface with the light source assembly 310. A second side 324 is configured to interface with the display assembly 330. A third side 326 is configured to interface with the output assembly 390. A fourth side 328 is configured to interface with the camera assembly 340. The first side and the fourth side are opposite as are the second side and the third side. In other embodiments, the beam splitter 320 is a mirror with a surface that is partially reflective and partially transmissive such that a first portion of the light transmits through the mirror and a second portion of the light reflects off the surface of the mirror. The mirror may be constructed by depositing a thin metallic coating onto a thin transmissive material such that the thin metallic coating increases the reflectiveness of the transmissive material.

The display assembly 330 is configured to generate image light and tracking light. The display assembly 330 receives visible light and image light generated by the light source assembly 310 which is reflected from the beam splitter 320, in accordance with display instructions from the controller 350. The display assembly 330 generates the image light with the visible light, wherein the image light may be used to form an image or a portion of an image. In one example, the image formed may be a graphical user interface. The display assembly 330 generates the tracking light with the infrared light. In some embodiments, the display assembly 330 may generate a structured illumination pattern for the tracking light. The structured illumination pattern may comprise various features (e.g., lines, circles, squares, triangles, dots, etc.) in the infrared channel which may distort when encountering various surfaces in the local area. For example, a hashed line pattern is used which has various portions distorting when encountering various objects in the local area. In other embodiments, the display assembly 330 may generate an infrared flash for the tracking light. The infrared flash comprises one or more light rays (e.g., from one pixel, from an array of pixels, from all pixels, etc.) in the infrared channel. The infrared flash reflects off of surfaces in the local area, and is captured by the camera assembly 340 to determine a time of flight from generation by the display assembly 330 to time of capture by the camera assembly 340.

The display assembly 330 may be constructed as one of many types of displays, e.g., a Microelectromechanical System (MEMS) type of display, a Liquid Crystal on Silicon (LCOS) type of display. In embodiments as a MEMS type of display, the display assembly 330 has one or more MEMS that scan the visible light and the infrared light with a motorized reflective surface to form the image light and the tracking light that is directed to the output assembly 390, more detailed description to follow in FIG. 4A. In embodiments as a LCOS type of display, the display assembly 330 has one or more LCOS that project the visible light and the infrared light by selectively reflecting pixels with an applied electrical bias to the liquid crystal layer, more detailed description to follow in FIG. 4B. Additionally, in some embodiments (not shown), the display assembly 330 may be a hybrid type that includes at least one MEMS and at least one LCOS.

In some embodiments, the display assembly 330 may reflect select pixels to generate a portion of the image light and the tracking light in accordance with display instructions from the controller 350. In these embodiments, the emitters of the light source assembly 310 are arranged in a pixel array such that the generated visible light and infrared light are arranged in an array similar to the pixel array. The display assembly 330 selectively reflects pixels from each of the visible channels to generate the image light. For example, the display assembly 330 selectively reflects various pixels at varying intensities in the visible green channel at a first time, in the visible red channel at a second time, and in the visible blue channel at a third time. The first time, the second time, and the third time are short enough and close enough together such that the eyes of the user perceive the light from the different color channels as a full color image. The result is a portion of the image light formed by the combination of the reflected pixels from each visible channel. Similar for the tracking light, the display assembly 330 selectively reflects pixels from the infrared channel to generate the tracking light, either the structured illumination pattern and/or the infrared flash.

In other embodiments, the display assembly 330 scans out the image light and the tracking light. In these embodiments, the emitters of the light source assembly 310 may be arranged as a single pixel, a linear array of pixels, or a 2D array of pixels. The display assembly 330 scans the generated visible light and infrared light in up to 2D to generate the image light and the tracking light. In an example with a single pixel, the display assembly 330 may raster scan in 2D to generate the image light and the tracking light with the single pixel. With the linear array of pixels, the display assembly 330 may scan in 1D, the direction orthogonal to the linear array, to generate the image light and the tracking light. The display assembly 330 may also scan generating portions of the image light and the tracking light by scanning in 2D with the linear array of pixels. According to similar principles described above, the display assembly 330 may also scan out the image light and the tracking light with a 2D array of pixels from the light source assembly 310.

The image light and the infrared light may also be time multiplexed, alone or in synchronization with the visible light and the infrared light, such that the image light and the tracking light are generated at varying times. For example, at a first time period, the display assembly 330 generates the image light and, at a second time period, the display assembly 330 generates the tracking light.

The camera assembly 340 is configured to capture one or more images of the local area. The camera assembly 340 includes one or more cameras, wherein each camera has a photo sensor that converts received light energy into an electrical signal. The photo sensor may be, for example, a charge-coupled device (CCD) or a complementary metal-oxide-semiconductor (CMOS) sensor. The camera assembly 340 may operate under various parameters including, e.g., ISO, shutter speed, and image quality. In some embodiments, the camera assembly 340 may capture images illuminated with visible light and/or infrared light. For example, one camera of the camera assembly 340 can capture images in the visible channel while another camera of the camera assembly 340 can capture images in the infrared channel. In other embodiments, the camera assembly 340 may be configured with a filter to remove other light not in the infrared channel. In embodiments with such a filter, the images captured are illuminated by infrared light. The camera assembly 340 may further include additional optical elements for conditioning of light prior to being captured by the camera assembly 340. The camera assembly 340 may also be actuated at varying times to capture an image. The camera assembly 340 captures one or more images of the local area illuminated by the tracking light, in accordance with capture instructions from the controller 350. In embodiments where the tracking light comprises an infrared flash, the camera assembly 340 records a time of capture of the reflected infrared flash with the captured images.

The output assembly 390 is configured to direct the image light and the tracking light into or from a local area. The output assembly 390 may receive image light and tracking light projected by the display assembly 330 and direct the image light and the tracking light into a local area. Similarly, light reflected off of objects in the local area may be directed by the output assembly 390 from the local area to the camera assembly 340. In some embodiments, the output assembly 390 is an aperture that directs the image light and the tracking light into or from the local area. In other embodiments, the output assembly 390 is a waveguide assembly that directs the image light and the tracking light into or from the local area with a plurality of waveguides that rely on total internal reflection to direct the image light and the tracking light, more detail description to follow in FIG. 5. The output assembly 390 may have additional optical components for conditioning of the image light and/or the tracking light. For example, the output assembly 390 has a varifocal lens for adjusting a focal plane of the image light and the tracking light.

The controller 350 is configured to control components of the display system 300. Specifically, the controller 350 controls the light source assembly 310, the display assembly 330, and the camera assembly 340. The controller 350 may physically include a non-transitory computer-readable storage medium with encoded instructions that instruct a computer processor to control the various components of the display system 300. The controller 350 may have a content store for storing visual content (e.g., in the form of content items) to be displayed by the display system 300.

The controller 350 generates display instructions for actuation of the light source assembly 310 and the display assembly 330, e.g., according to the content items stored in the content store and/or content items received from some other entity (e.g., server via a network connection). For example, the controller 350 obtains a content item in the content store to be provided to the user of the display system 300. The controller 350 generates display instructions based on the content item such that the light source assembly 310 generates the visible light and the infrared light that may be used by the display assembly 330 to generate the content item. The display instructions further instruct the display assembly 330 in generating the image light and the tracking light from the generated visible light and the infrared light. The display instructions may also synchronize the time multiplexing of the visible light and the infrared light (as generated by the light source assembly 310) and the image light and the tracking light (as generated by the display assembly 330).

The controller 350 may generate display instructions to time multiplex the image light and the tracking light with varying interleaving patterns for interleaving frames of the image light and frames for the tracking light. For example, an interleaving pattern consists of three consecutive frames of image light then one frame of tracking light, the pattern being repeated. In some embodiments, the controller 350 may adjust the display instructions with a different interleaving pattern upon determination that one or more objects are present in the local area. Following the example described above, upon detecting one or more objects in the local area, the controller 350 may adjust the display instructions with a new interleaving pattern consisting of one consecutive frame of image light followed by one frame of tracking light.

The controller 350 may also generate display instructions with variable content (e.g., image light and/or tracking light) in different portions of the local area. In some embodiments, the controller 350 may have determined a gaze orientation of a user's eyes in the local area; the controller 350 generates variable resolution of image light between a foveated portion and a non-foveated portion. In other embodiments, the controller 350 may generate variable tracking light—e.g., different structured illumination patterns or different intensities of the infrared flash—in different portions of the local area. In an example, the controller 350 may generate a denser structured illumination pattern in portions of the local area where an object is detected for more precise depth determination of the object with the denser structured illumination pattern.

The controller 350 may also manage actuation of the camera assembly 340. The controller 350 may provide capture instructions to the camera assembly 340 to capture images. The capture instructions may dictate various parameters for the camera assembly 340. In embodiments where the tracking light comprises an infrared flash, the controller 350 may generate the capture instructions to record a time of capture of the reflected infrared flash, the time of capture useful for determining a time of flight for the infrared flash.

Additionally, the controller 350 may determine depth information of objects in the local area from images captured by the camera assembly 340. In embodiments, wherein the tracking light comprises a structured illumination pattern, the controller 350 uses images from the camera assembly 340 of the local area illuminated with the structured illumination pattern. The controller 350 from the image can calculate depth information including one or more depth distances of various surfaces that have reflected the structured illumination pattern. Furthermore, the controller 350 may identify objects from the images with the depth information corresponding to depth of the objects in the local area.

In embodiments where the tracking light comprises a flash, the controller 350 calculates a time of flight of the flash that measures a time from projection of the tracking light by the display assembly 330 to when the image is captured with the tracking light. In some embodiments, the camera assembly 340 may record a time that each pixel on the photo sensor achieves above a threshold light intensity from the reflected flash. The controller 350 may calculate a depth distance of a surface that reflected light captured by each pixel in the photo sensor. In other embodiments, the camera assembly 340 may control capturing of multiple images. Each image would be separated by some period of time, wherein each image may have some pixels that captured a portion of the reflected flash. Pixels above a threshold intensity in an image may be used by the controller 350 to calculate a depth of a surface at that pixel. From each image, the controller 350 may calculate various depth distances of various surfaces. From depth distances of various surfaces, the controller 350 may determine one or more objects present in the local area. The controller 350 can calculate depth information corresponding to depth of determined objects in the local area with the calculated time of flight.

In some embodiments, the controller 350 may determine one or more user inputs using the depth information of objects in the local area with which the controller 350 may generate new display instructions in response to the inputs. For example, the display system 300 projects a graphical user interface onto a surface in the local area. The depth information of a user's finger may correspond to a selection input of an option on the graphical user interface. The display system 300, in response, generates new display instructions to update the graphical user interface. In other embodiments, the controller 350 may determine tracking information of objects in the local area using the depth information of objects in the local area. For example, in some embodiments, the display system 300 may be implemented in a headset to present visual content to a user such that the controller 350 may determine tracking information of the user's eyes.

In an example application of the display system 330, the display system 330 projects light into a local area and detects depth information by receiving light from the local area. Following the ray lines for the light output into the local area, the controller 350 generates display instructions for actuation of the light source assembly 310. Accordingly, the light source assembly 310 generates light 363 (e.g., the visible light and/or the infrared light). The light 362 encounters the first side 322 of the beam splitter 320, wherein a portion of the light 362 is reflected to the display assembly 330. The display assembly 330, according to the display instructions, generates light 364 (e.g., the image light and the tracking light) from light 362. Light 364 encounters the second side 324 of the beam splitter 320, wherein a portion of light 364 passes through to the output assembly 390 which then directs light 366 into the local area. Following the ray lines for the light received from the local area, light 372 (e.g., any combination of reflected image light, reflected tracking light, and externally sourced light) is received through the output assembly 390. Light 372 encounters the third side 326 of the beam splitter 320, wherein a portion of the light 372 is reflected towards the camera assembly 340. The controller 350 actuates the camera assembly 340 to capture images of the local area from the light 372. In some embodiments, the camera assembly 340 is configured with a filter to remove any light not in the infrared channel. In these embodiments, the photo sensor of the camera assembly 340 captures the images generally composed of reflected tracking light. The controller 350 may then use the images illuminated by the tracking light to determine depth information of objects in the local area, in some instances, in relation to the projected image light.

Figure 4A:
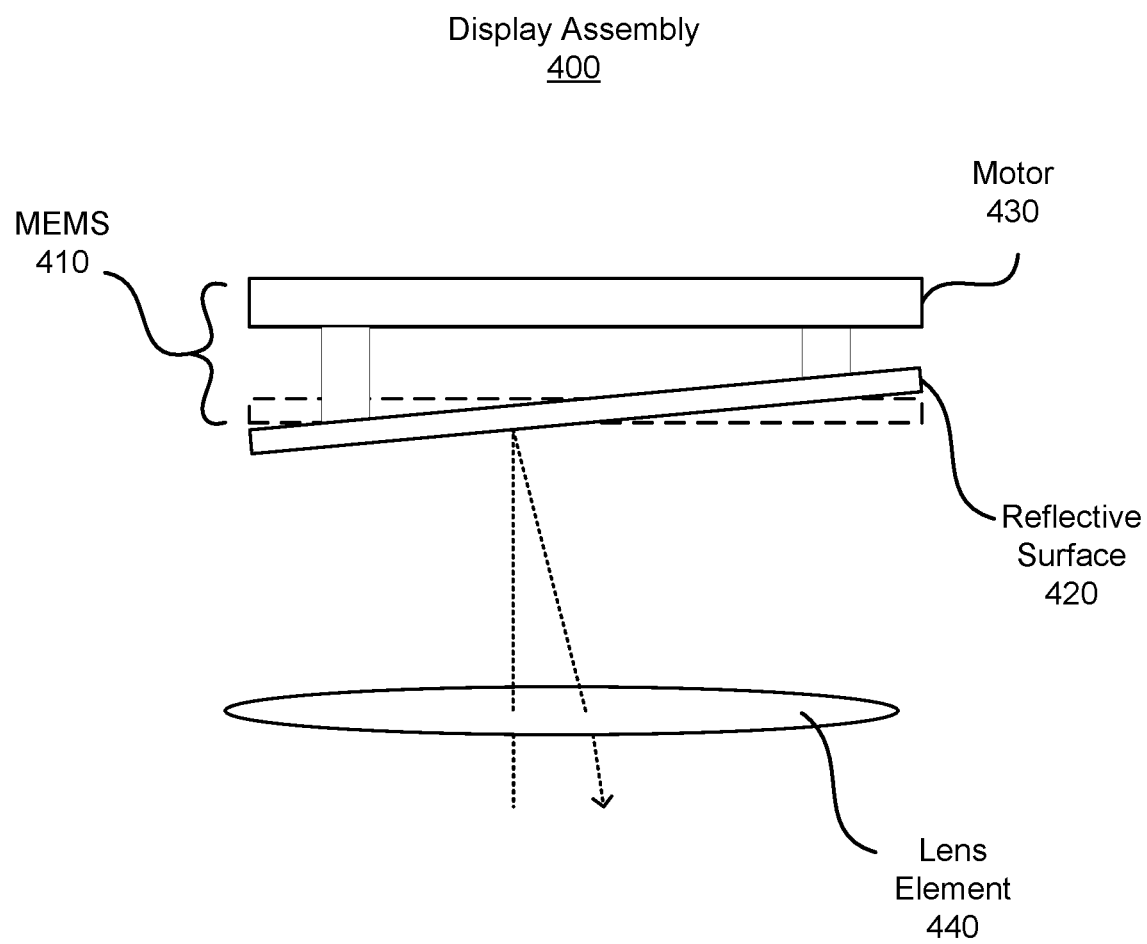
FIG. 4A illustrates a display assembly implementing a Microelectromechanical System (MEMS) type of display, in accordance with one or more embodiments.

FIG. 4A illustrates a display assembly 400 as a MEMS type of display, in accordance with one or more embodiments. In other embodiments, the display assembly 400 comprises additional or fewer components than those listed herein. The display assembly 400 generates the image light and the tracking light from the visible light and the infrared light, respectively. In the embodiment illustrated in FIG. 4A, the display assembly 400 has a MEMS 410. The display assembly 400 is an embodiment of the display assembly 330. Optionally, the display assembly 330 may have a lens element 440 for some type of conditioning of the image light and the tracking light (e.g., correcting distortions, adjusting a focal plane, etc.).

The MEMS 410 reflects the visible light and the infrared light to generate the image light and the tracking light. The MEMS 410 has a reflective surface 420 with a motor 430 coupled to the reflective surface. The reflective surface 420 reflects both the visible light and the infrared light that is incident on the reflective surface 420. The reflective surface 420 may be a mirror or another material with high reflectance in both the visible channel and the infrared channel. The motor 430 is coupled to the reflective surface 420. The motor 430 may mechanically move the reflective surface 420 in at least two degrees of freedom, e.g., rotating the reflective surface 420 about a point on the reflective surface. The motor 420 may comprise one or more electromechanical actuators that convert electrical energy into mechanical movement, e.g., voice coil transducer, piezoelectric transducer, etc. The display assembly 330 may generate the image light and the tracking light by scanning the visible light and the infrared light with the MEMS 410. In other embodiments, the MEMS 410 comprises multiple reflective surfaces that may be configured to oscillate dependently or independently of other reflective surfaces. For example, a first reflective surface may be configured to oscillate in a first direction with a second reflective surface configured to oscillate in a second direction that is orthogonal to the first direction. In this configuration, the two reflective surfaces provide an ability to scan out a portion of the image light and the tracking light in up to 2-dimensions.

Figure 4B:
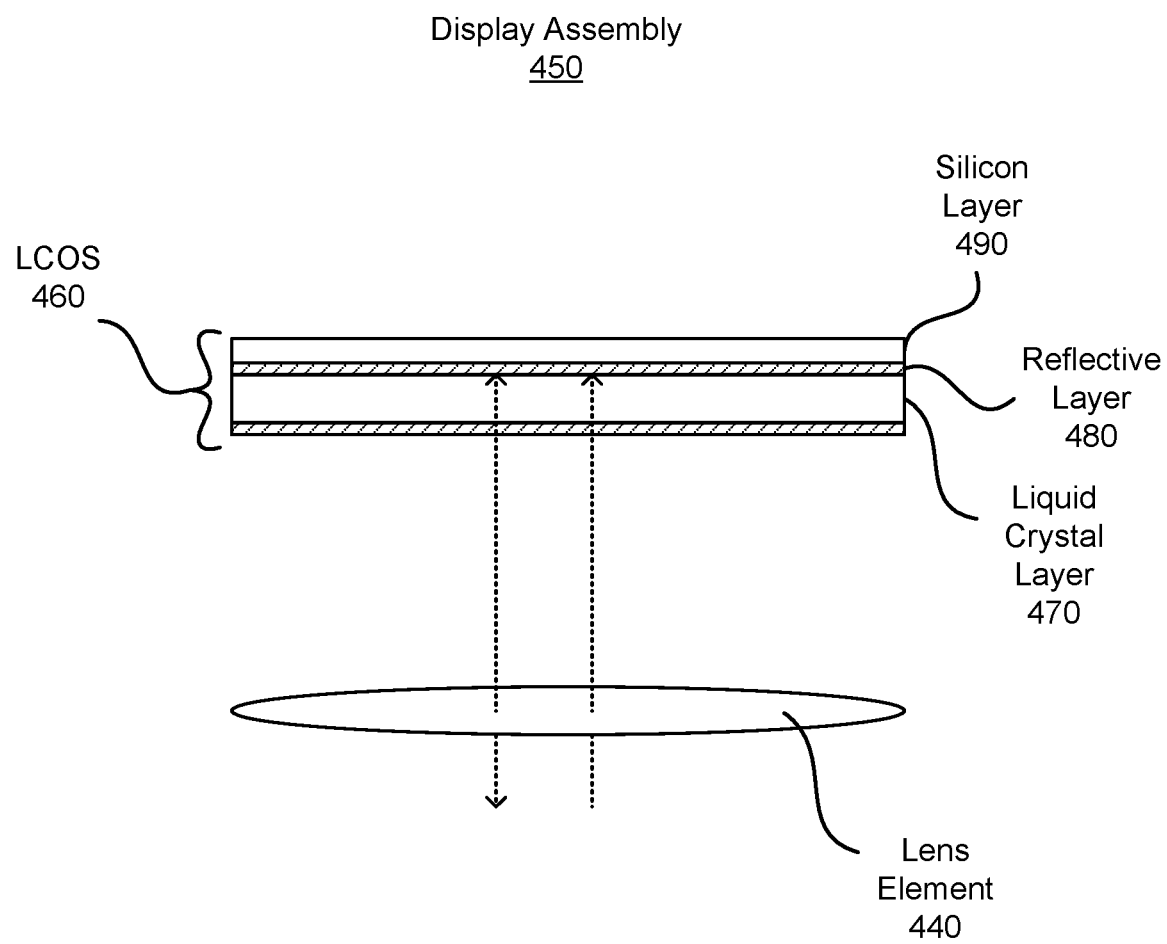
FIG. 4B illustrates a display assembly implementing a Liquid Crystal on Silicon (LCOS) type of display, in accordance with one or more embodiments.

FIG. 4B illustrates a display assembly 450 as a LCOS type of display, in accordance with one or more embodiments. In other embodiments, the display assembly 450 comprises additional or fewer components than those listed herein. The display assembly 330 generates the image light and the tracking light from the visible light and the infrared light, respectively. In the embodiment illustrated in FIG. 4B, the display assembly 450 has a LCOS 460. The display assembly 450 is an embodiment of the display assembly 330. Optionally, the display assembly 450 may have a lens element 440 for some type of conditioning of the image light and the tracking light (e.g., correcting distortions, adjusting a focal plane, etc.).

The LCOS 460 reflects the visible light and the infrared light to generate the image light and the tracking light. The LCOS 460 comprises a liquid crystal (LC) layer 470, a reflective layer 480, and a silicon layer 490 (or more broadly, a semiconductive layer). The LC layer 470 may have a plurality of wells each holding a LC. The LCOS 460 is configured to apply an electric field to each of the wells using an electrode coupled to the LC layer 470 and the silicon layer 490. The applied electric field causes the LC in each well to align along the direction of the electric field. When the LC in a well is aligned, the well has an increased transmissiveness, thereby, allowing light to transmit through the well or through the LC layer 470. Light that passes through the LC layer 470 is incident upon the reflective layer 480 that can reflect both visible light and infrared light. The reflective layer 480, similar to the reflective surface 420, may be a mirror or another material with high reflectance in both the visible channel and the infrared channel. To use the LCOS 460, the light source assembly 310 may be time multiplexed to rotate flashing all pixels at various wavelengths, e.g., red, green, blue, and infrared. According to display instructions, the display assembly 450 generates the image light and the tracking light to be time multiplexed by selectively applying an electric field to each well determining which well reflects the visible light and the infrared light. The reflected light combines to form a portion of the image light and/or the tracking light.

Figure 5:
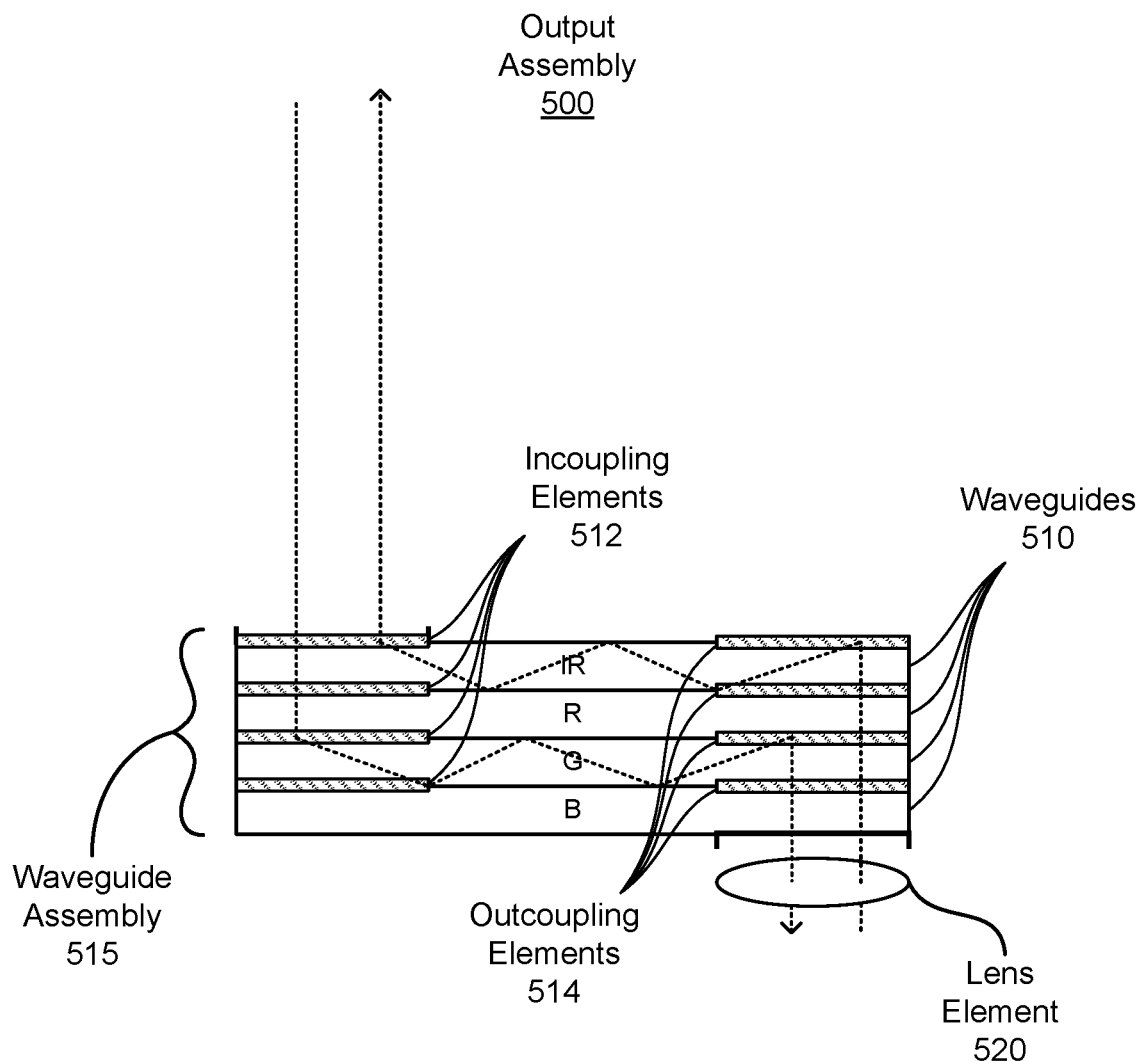
FIG. 5 illustrates an output assembly implementing a waveguide assembly, in accordance with one or more embodiments.

FIG. 5 illustrates an output assembly 500 that includes a plurality of waveguides 510 that form a waveguide assembly 515, in accordance with one or more embodiments. In other embodiments, the output assembly 500 comprises additional or fewer components than those listed herein. The output assembly 500 is an embodiment of the output assembly 390. Optionally, the output assembly 500 may have a lens element 520 for some type of conditioning of the image light and the tracking light (e.g., correcting distortions, adjusting a focal plane, etc.).

The waveguide assembly 515 directs light into and from the local area. The waveguide assembly 515 comprises one or more waveguides 510 that guide light through internal reflection from incoupling elements 512 to outcoupling elements 514 and vice versa. Each waveguide has an incoupling element of the incoupling elements 512 for incoupling light of a certain wavelength and an outcoupling element of outcoupling elements 514 for outcoupling of light of a certain wavelength. In some embodiments, the incoupling elements 512 and the outcoupling elements 514 are gratings, e.g., a diffraction grating, a holographic grating, a holographic reflector, a set of reflective surfaces, some other element for coupling light into the waveguides 510, or some combination thereof. For example, in embodiments where the coupling element 350 is diffraction grating, the pitch of the diffraction grating is chosen such that total internal reflection occurs, and the image light 340 propagates internally toward the decoupling element 360. For example, the pitch of the diffraction grating may be in the range of 300 nm to 600 nm. In the example illustrated, there is a first waveguide for directing light in an infrared channel, a second waveguide for directing light in a visible red channel, a third waveguide for directing light in a visible green channel, and a fourth waveguide for directing light in a visible blue channel. In other configurations, there may be more or less waveguides 510 for directing various wavelengths of light. As another example, there may be a first waveguide configured to direct light in an infrared channel, a second waveguide configured to direct light in a visible green channel and a visible blue channel, and a third waveguide configured to direct light in a visible color channel for remaining colors. Light to be projected into the local area is incoupled into the waveguides 510 via the incoupling elements 512. The light internally reflects through the waveguides 510 until outcoupled via the outcoupling elements 514 into the local area. In a complementary fashion, light to be received from the local area is incoupled into the waveguides 510 via the outcoupling elements 514. The light internally reflects through the waveguides 510 until outcoupled via the incoupling elements 512, e.g., towards the beam splitter 320.

With multiple waveguides 510 configured to guide distinct wavelengths of light, each waveguide may implement a filter at one or more of the ends to selectively allow light a range of wavelengths to enter the waveguide. In one or more embodiments, the waveguide assembly 515 may aid in creating a compact display system 300 that may project the image light and the tracking light from the waveguide assembly 515 directly to a user's eyes, the waveguide assembly 515 can also remain relatively thin and low-profile compared to the other components of the display system 300. Additional details regarding the waveguide assembly 515 and/or the waveguides 510 (e.g., output waveguide(s)) and their respective incoupling elements 512 outcoupling elements 514 may be found at, e.g., U.S. application Ser. No. 15/704,190 and U.S. patent application Ser. No. 15/495,373 which are incorporated by reference in their entirety.

Headset

Figure 6A:
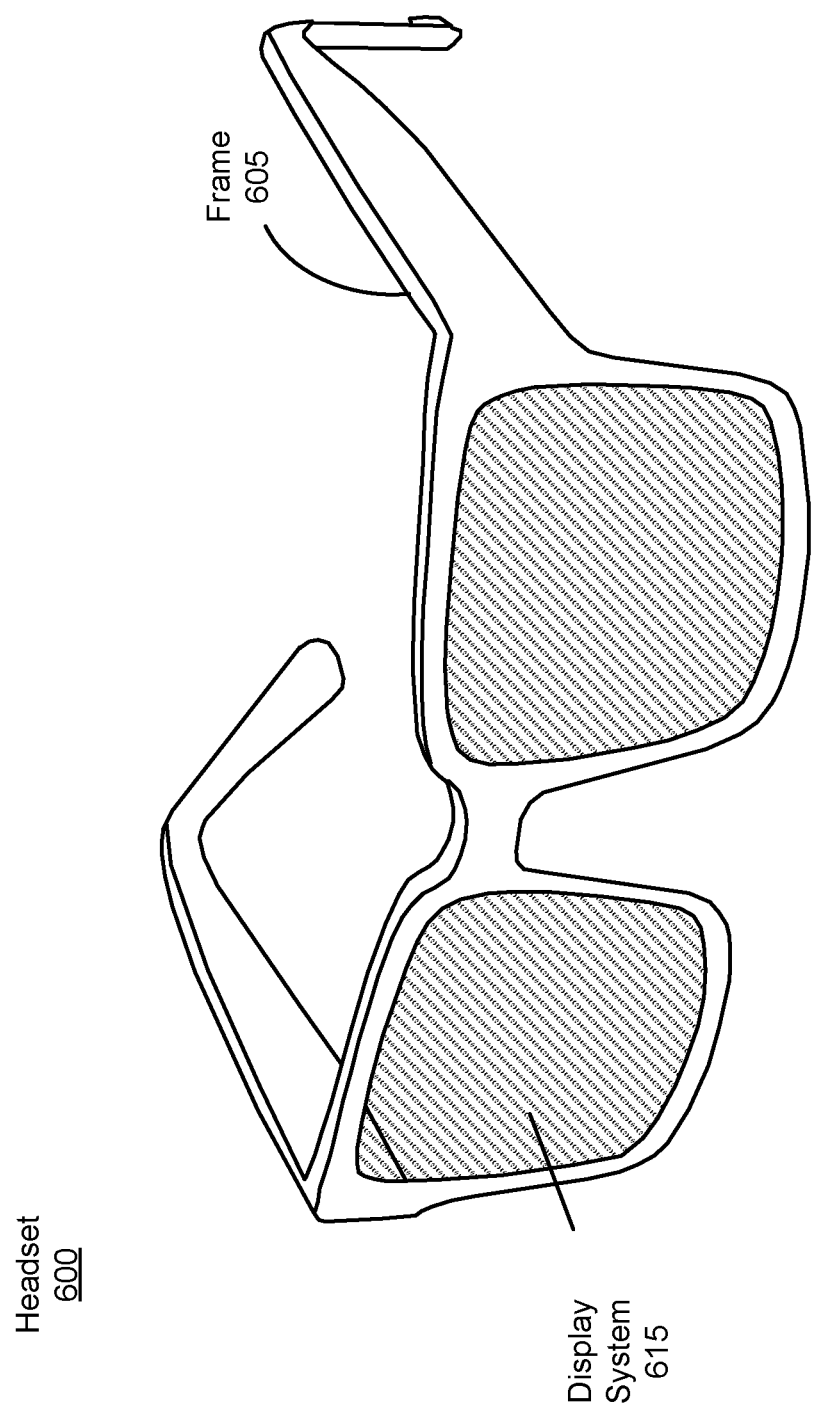
FIG. 6A is a perspective view of a headset with a display system, in accordance with one or more embodiments.

FIG. 6A is a perspective view of a headset 600 with a display system 615, in accordance with one or more embodiments. The headset 600 presents media to a user. Examples of media presented by the headset 600 include one or more images, video, audio, or some combination thereof. The headset 600 may be an eyewear device or a head-mounted display (HMD). The headset 600 includes, among other components, a frame 605 and the display system 615. The display system 615 may be an embodiment of the display system 300.

The frame 605 includes a front part that holds the display system 615 and end pieces to attach to the user. The front part of the frame 605 bridges the top of a nose of the user. The end pieces (e.g., temples) are portions of the frame 605 to which the temples of a user are attached. The length of the end piece may be adjustable (e.g., adjustable temple length)

to fit different users. The end piece may also include a portion that curls behind the ear of the user (e.g., temple tip, ear piece).

Figure 6B:
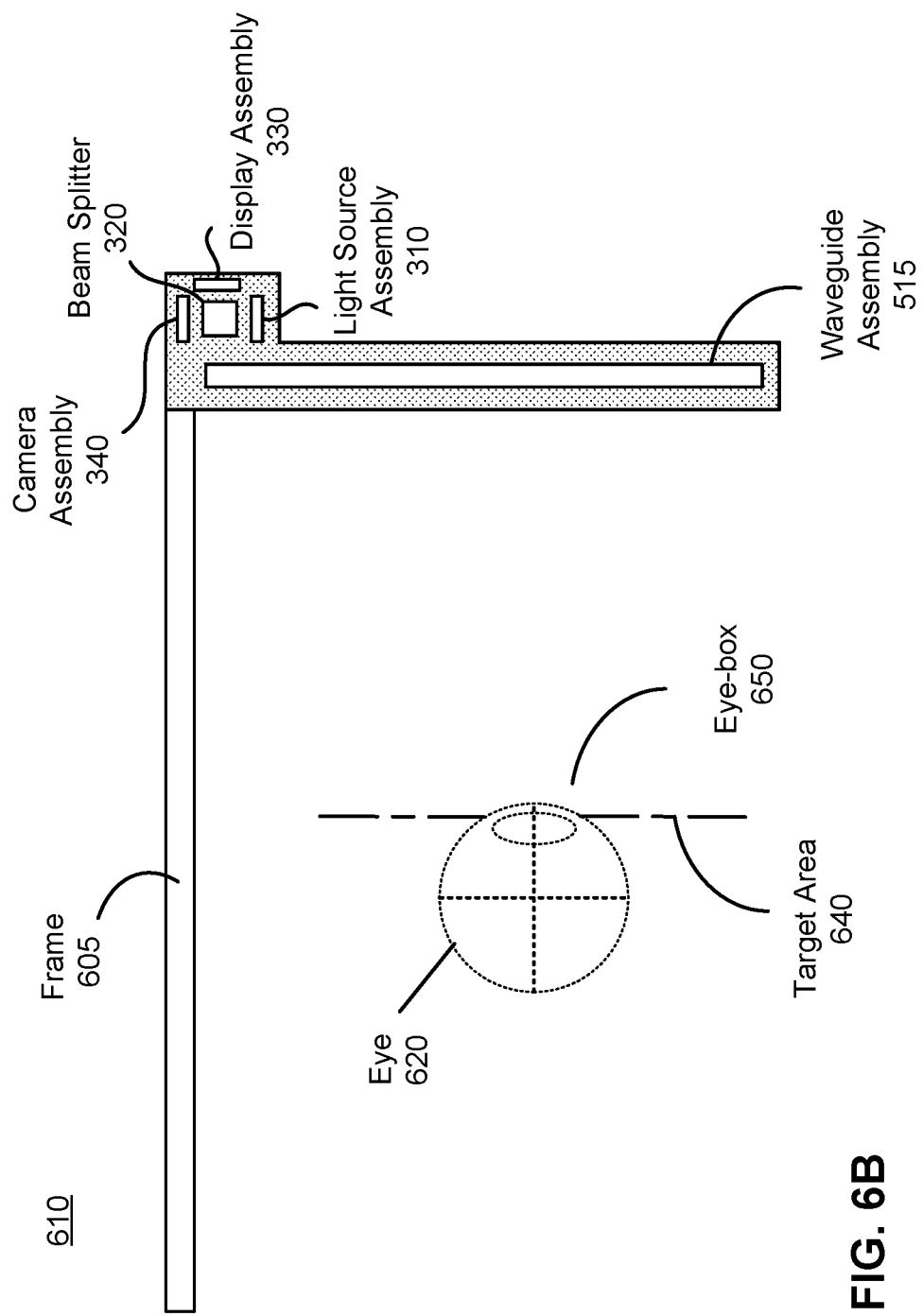
FIG. 6B is a cross-section view of the headset illustrated in FIG. 6A, in accordance with one or more embodiments.

FIG. 6B is a cross-section view 610 of the headset 600 illustrated in FIG. 6A, in accordance with one or more embodiments. An eye-box 650 is a location where an eye 620 is positioned when the user wears the headset 600. A target area 640 includes the eye-box 650. For purposes of illustration, FIG. 6B shows the cross section view 610 associated with a single eye 620 and a single display system 615, but in alternative embodiments not shown, another display system which is separate from the display system 615 shown in FIG. 6B, provides visual content to an eye-box of another eye of the user while determining depth information of the other eye.

The display system 615, as illustrated below in FIG. 6B, is configured to present visual content to the eye-box 650 of the eye 620 while determining an eye position of the eye 620. The display system 615, as an embodiment of the display system 300 implementing the output assembly 500, has the light source assembly 310, the beam splitter 320, the display assembly 330, the camera assembly 340, the waveguide assembly 515, and the controller 350 (not shown). The light source assembly 310 is configured to generate visible light and infrared light, according to display instructions from the controller 350. The visible light includes light generated in any visible color channel; whereas, infrared light includes light generated in an infrared channel. The display assembly 330 is configured to generate the image light using the visible light and to generate tracking light using the infrared light, according to display instructions from the controller 350. The generated image light includes light from one or more visible color channels that forms a portion of visual content that is presented to the target area 640. The generated tracking light includes light from an infrared channel that illuminates the local area. The waveguide assembly 515 projects the tracking light and the image light into the target area 640. The camera assembly 340 is configured to capture one or more images of the target area 640 illuminated with the tracking light, e.g., a reflection of the structured illumination pattern and/or a reflection of the infrared flash. The presentation of the image light and the tracking light and the capturing of images of the target area 640 are accomplished via a shared optical pathway amongst the components of the display system 615. The display system 615 has the advantage that the projection of visual content and recording of depth information share a common optical pathway, e.g., through the waveguide assembly 515.

The controller 350 is configured to calculate depth information for the eye 620 in the target area 640 using the one or more images. Based on eye positions (e.g., for the eye 620 and for the other eye), the controller 350 may determine a gaze orientation describing a direction of the user's gaze. The gaze orientation may be determined as the intersection of rays drawn from each eye based on the determined eye positions. Additional details about the display system 215 can be found in the detailed description of FIGS. 3-5.

In some configurations, the headset 600 includes one or more optical elements between the display system 615 and the eye 620. The optical elements may act to, e.g., correct aberrations in image light emitted from the display assembly 610, magnify image light emitted from the display assembly 610, apply some other optical adjustment of image light emitted from the display assembly 610, or some combination thereof. The example for optical elements may include an aperture, a Fresnel lens, a convex lens, a concave lens, a filter, or any other suitable optical element that affects image light.

Artificial Reality System Environment

Figure 7:
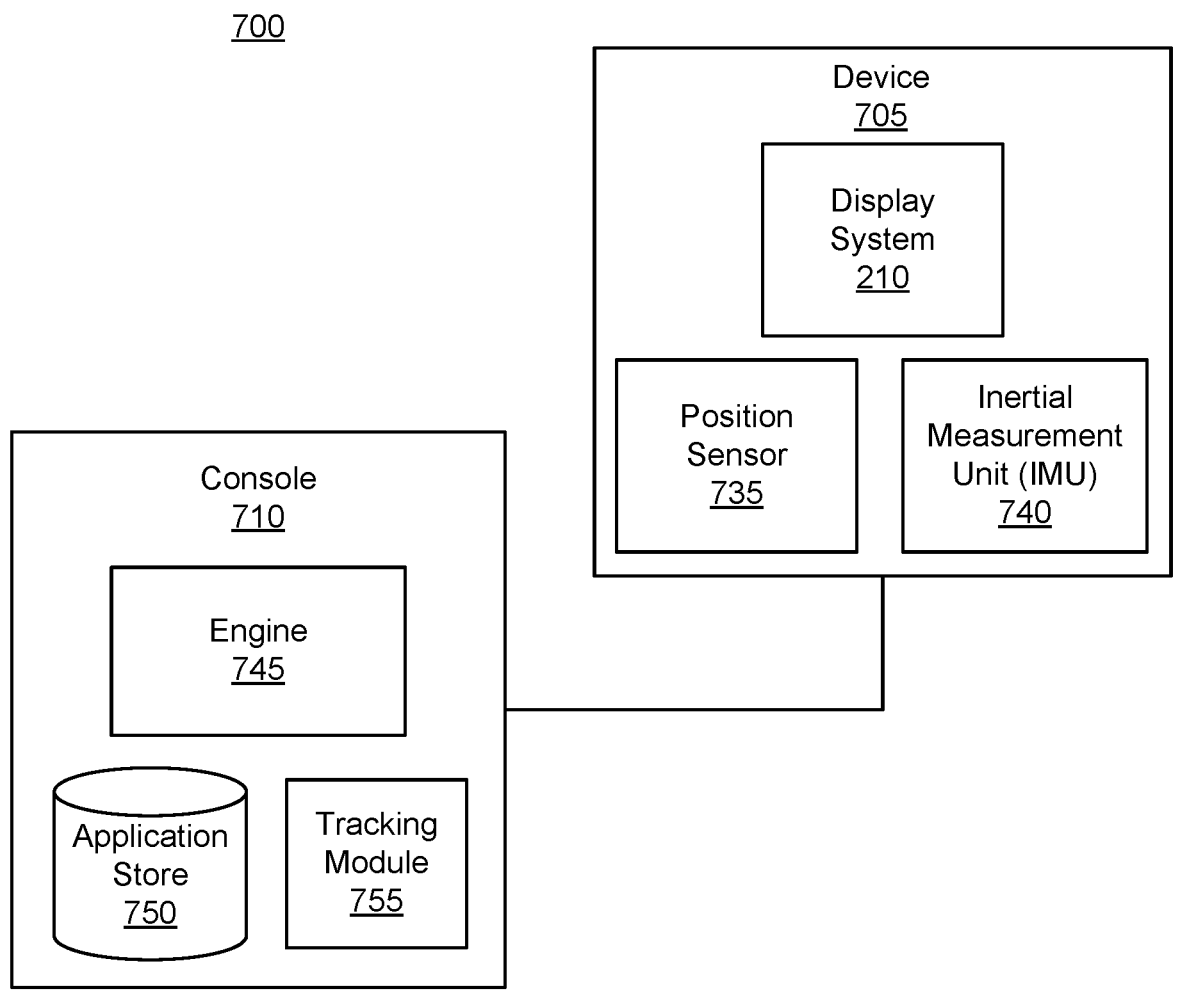
FIG. 7 is a system environment of an artificial reality system including a display system, in accordance with one or more embodiments.

FIG. 7 is a system 700 environment of an artificial reality system including a display system 300, in accordance with one or more embodiments. The system 700 may operate in an artificial reality environment, e.g., a virtual reality, an augmented reality, a mixed reality environment, or some combination thereof. The system 700 shown by FIG. 7 comprises a device 705 and may additionally include other input/output (I/O) devices (not shown) that may be coupled to a console 710. The device 705 may be an embodiment of the headset 600 or the wristband devices 100 and 200. While FIG. 7 shows an example system 700 including one device 705, in other embodiments, any number of additional components may be included in the system 700. In alternative configurations, different and/or additional components may be included in the system 700. Additionally, functionality described in conjunction with one or more of the components shown in FIG. 7 may be distributed among the components in a different manner than described in conjunction with FIG. 7 in some embodiments. For example, some or all of the functionality of the console 710 may be integrated into the device 705.

The device 705 includes the display system 300 of FIG. 3 for presenting visual content to a user comprising virtual elements (e.g., two dimensional (2D) or three dimensional (3D) images, 2D or 3D video, etc.). The device 705 may be a wristband device (e.g., the wristband devices 100 and 200), a headset (e.g., the headset 600), or another device for both presenting visual content into a local area and determining depth information of objects in the local area via a shared optical pathway. In some embodiments, the device 705 projects the visual content into a local area or onto a surface in the local area. The visual content may include a graphical user interface (GUI) including various graphical elements and options for input. In other embodiments, the device 705 presents visual content to the user that is based in part on a real local area surrounding the user. For example, a virtual model of the real local area may be presented to a user of the device 705. The user physically may be in a room, and virtual walls and a virtual floor of the room are rendered as part of the virtual content.

Specifically, the display system 300 presents the visual content. As described above, the display system 300 may include a light source assembly 310, a beam splitter 320, a display assembly 330, a camera assembly 340, an output assembly 390, and a controller 330. The light source assembly 310 is configured to generate visible light and infrared light. The visible light and the infrared light are reflected by the beam splitter 320 towards the display assembly 330. The display assembly 330 is configured to generate image light using the visible light and to generate tracking light using the infrared light. The tracking light and the image light pass through the beam splitter 320 towards the output assembly 390. The output assembly 390 projects the image light and the tracking light into a local area, e.g., a portion of a user's arm for a wristband device or an eye-box of a headset. The camera assembly 340 is configured to capture one or more images of the local area illuminated with the tracking light. Tracking light from the local area is reflected by the beam splitter 320 prior to be being captured by the camera assembly 340. The controller 350 is configured to calculate depth information for objects (e.g., one or more thumbs, one or more fingers, one or more eye positions, etc.) in the local area using the one or more images. The depth information may be used as input.

The IMU 740 is an electronic device that generates data indicating a position of the device 705 based on measurement signals received from one or more of the position sensors 735. A position sensor 735 generates one or more measurement signals in response to motion of the device 705. Examples of position sensors 735 include: one or more accelerometers, one or more gyroscopes, one or more magnetometers, another suitable type of sensor that detects motion, a type of sensor used for error correction of the IMU 740, or some combination thereof. The position sensors 735 may be located external to the IMU 740, internal to the IMU 740, or some combination thereof. The IMU and the position sensor of the sensor devices 210 and 610 are embodiments of the IMU 740 and the position sensor 735.

Based on the one or more measurement signals from one or more position sensors 735, the IMU 740 generates data indicating an estimated current position of the device 705 relative to an initial position of the device 705. For example, the position sensors 735 include multiple accelerometers to measure translational motion (forward/back, up/down, left/right) and multiple gyroscopes to measure rotational motion (e.g., pitch, yaw, and roll). In some embodiments, the IMU 740 rapidly samples the measurement signals and calculates the estimated current position of the device 705 from the sampled data. For example, the IMU 740 integrates the measurement signals received from the accelerometers over time to estimate a velocity vector and integrates the velocity vector over time to determine an estimated current position of a reference point on the device 705. Alternatively, the IMU 740 provides the sampled measurement signals to the console 710, which interprets the data to reduce error. The reference point is a point that may be used to describe the position of the device 705. The reference point may generally be defined as a point in space or a position related to the headset's 705 orientation and position.

The console 710 provides content to the device 705 for processing in accordance with information received from the device 705. In the example shown in FIG. 7, the console 710 includes an application store 750, a tracking module 755, and an engine 745. Some embodiments of the console 710 have different modules or components than those described in conjunction with FIG. 7. Similarly, the functions further described below may be distributed among components of the console 710 in a different manner than described in conjunction with FIG. 7.

The application store 750 stores one or more applications for execution by the console 710. An application is a group of instructions, that when executed by a processor, generates content for presentation to the user. Content generated by an application may be in response to inputs received from the user via movement of the device 705 or the I/O interface 715. Examples of applications include: gaming applications, conferencing applications, video playback applications, or other suitable applications.

The tracking module 755 calibrates the system environment 700 using one or more calibration parameters and may adjust one or more calibration parameters to reduce error in determination of the position of the device 705. Calibration performed by the tracking module 755 also accounts for information received from the IMU 740 in the device 705. Additionally, if tracking of the device 705 is lost, the tracking module 755 may re-calibrate some or all of the system environment 700.

The tracking module 755 tracks movements of the device 705 using information from the one or more position sensors 735, the IMU 740, or some combination thereof. For example, the tracking module 755 determines a position of a reference point of the device 705 in a mapping of a local area based on information from the device 705. Additionally, in some embodiments, the tracking module 755 may use portions of data indicating a position or the device 705 from the IMU 740 to predict a future position of the device 705. The tracking module 755 provides the estimated or predicted future position of the device 705 to the engine 745.

The engine 745 also executes applications within the system environment 700 and receives position information, acceleration information, velocity information, predicted future positions, or some combination thereof, of the device 705 from the tracking module 755. Based on the received information, the engine 745 determines content to provide to the device 705 for presentation to the user. For example, if the received information indicates that the user has looked to the left, the engine 745 generates content for the device 705 that mirrors the user's movement in a virtual environment or in an environment augmenting the local area with additional content. Additionally, the engine 745 performs an action within an application executing on the console 710, in response to any inputs received from device 705, and provides feedback to the user that the action was performed. The provided feedback may be visual via the device 705.

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A method comprising:
   generating within a first time period, via a display assembly, image light, wherein the image light is provided to a beam splitter;
   generating within a second time period, via the display assembly, tracking light, wherein the tracking light is provided to the beam splitter;
   outputting the image light and the tracking light from the beam splitter into a local area within the first time period and the second time period, respectively;
   capturing an image of the local area illuminated with the tracking light, wherein tracking light from the local area passes through the beam splitter prior to be being captured as the image; and
   calculating depth information for an object in the local area using the image.

2. The method of claim 1, further comprising:
   generating visible light within the first time period, wherein the visible light is provided to the beam splitter;
   generating infrared (IR) light within the second time period, wherein the IR light is provided to the beam splitter; and
   outputting, via the beam splitter, the visible light and the IR light toward the display assembly within the first time period and the second time period respectively.

3. The method of claim 1, wherein the display assembly is a Liquid Crystal on Silicon (LCoS) display, the method further comprising:
   time multiplexing the generation of the image light and the generation of the tracking light.

4. The method of claim 1, wherein the display assembly is a Microelectromechanical system (MEMs) scanning display, the method further comprising:
   time multiplexing the generation of the image light and the generation of the tracking light.

5. The method of claim 1, wherein the tracking light is a structured illumination pattern.

6. The method of claim 1, wherein the tracking light is an infrared flash.

7. The method of claim 1, wherein the image light forms an image of a user interface that is projected into the local area, the method further comprising:
   determining an input based on the depth information for the object in relation to the image of the user interface.

8. The method of claim 7, wherein the local area includes a portion of a user's body.

9. The method of claim 8, wherein the portion of the user's body includes any combination of a portion of a palm, a portion of a back of a hand, and a portion of a forearm.

10. The method of claim 1, wherein the local area includes an eyebox, the method further comprising:
    determining gaze orientation of an eye in the eye-box using the depth information.

11. A method comprising:
    generating visible light within a first time period, wherein the visible light is provided to a first side of a beam splitter;
    generating infrared (IR) light within a second time period, wherein the IR light is provided to the first side of the beam splitter;
    outputting, from a second side of the beam splitter, the visible light and the IR light toward the display assembly within the first time period and the second time period respectively;
    generating within the first time period, via the display assembly, image light, wherein the image light is provided to the second side of the beam splitter;
    generating within the second time period, via the display assembly, tracking light, wherein the tracking light is provided to the second side of the beam splitter;
    outputting the image light and the tracking light from a third side of the beam splitter into a local area within the first time period and the second time period, respectively;
    capturing an image of the local area illuminated with the tracking light, wherein tracking light from the local area passes through the third side of the beam splitter and a fourth side of the beam splitter prior to be being captured as the image; and
    calculating depth information for an object in the local area using the image.

12. The method of claim 11, wherein the first side is opposite the fourth side, and the second side is opposite the third side.

13. The method of claim 11, wherein the display assembly is a Liquid Crystal on Silicon (LCoS) display, the method further comprising:
    time multiplexing the generation of the image light and the generation of the tracking light.

14. The method of claim 11, wherein the display assembly is a Microelectromechanical system (MEMs) scanning display, the method further comprising:
    time multiplexing the generation of the image light and the generation of the tracking light.

15. The method of claim 11, wherein the tracking light is a structured illumination pattern.

16. The method of claim 11, wherein the tracking light is an infrared flash.

17. The method of claim 11, wherein the image light forms an image of a user interface that is projected into the local area, the method further comprising:
    determining an input based on the depth information for the object in relation to the image of the user interface.

18. The method of claim 17, wherein the local area includes a portion of a user's body.

19. The method of claim 18, wherein the portion of the user's body includes any combination of a portion of a palm, a portion of a back of a hand, and a portion of a forearm.

20. The method of claim 11, wherein the local area includes an eyebox, the method further comprising:

determining gaze orientation of an eye in the eye-box using the depth information.

* * * * *